Sept. 30, 1952      E. A. ZANG      2,612,214
AXIALLY SHIFTING TYPE HYDRAULICALLY OPERABLE TIRE REMOVER
Filed Jan. 9, 1947      2 SHEETS—SHEET 1
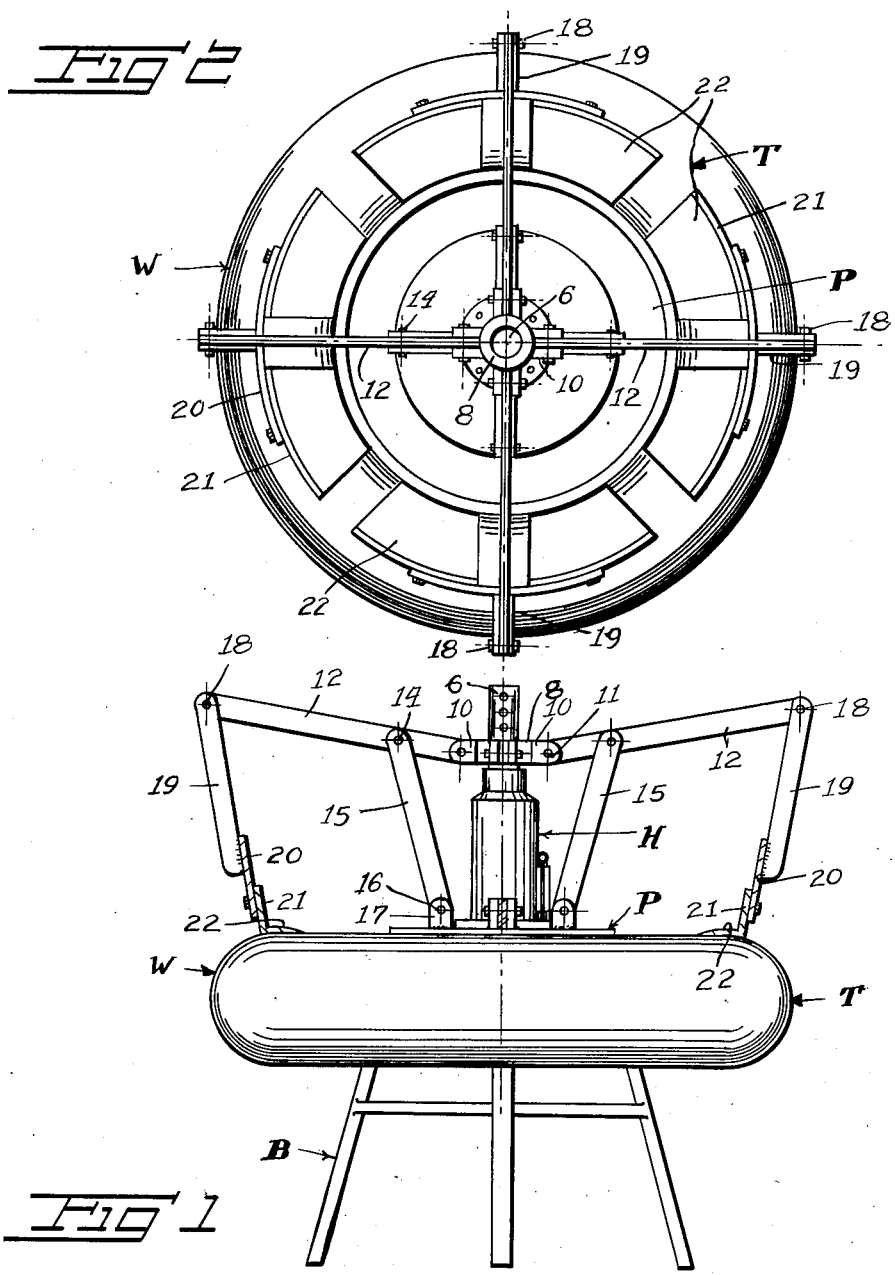
INVENTOR.
Elbern A. Zang
BY

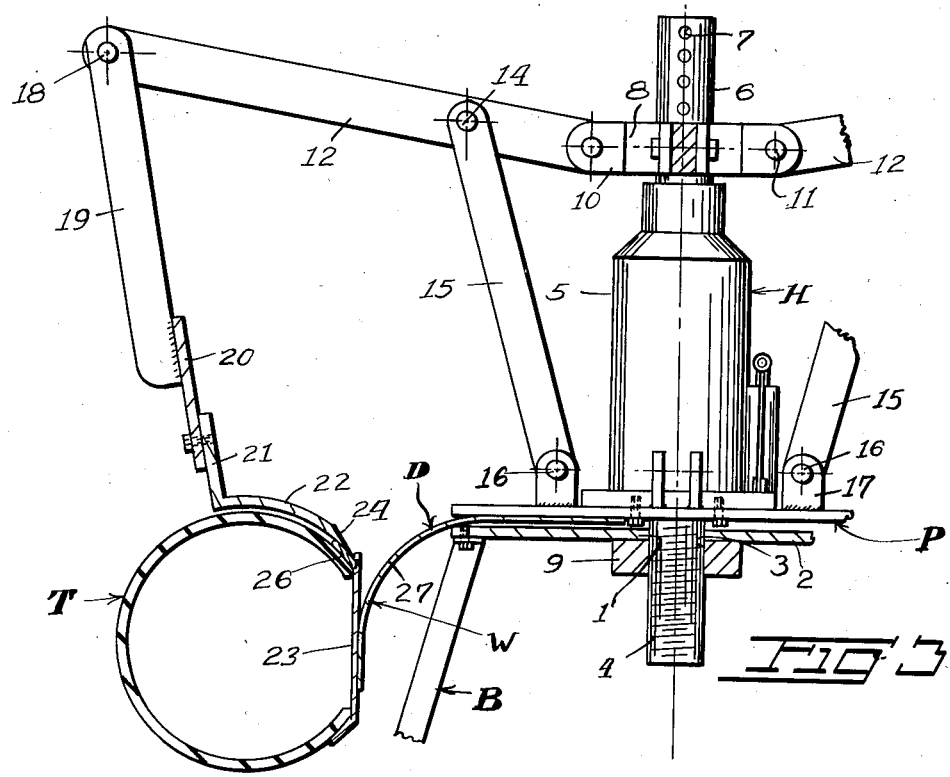
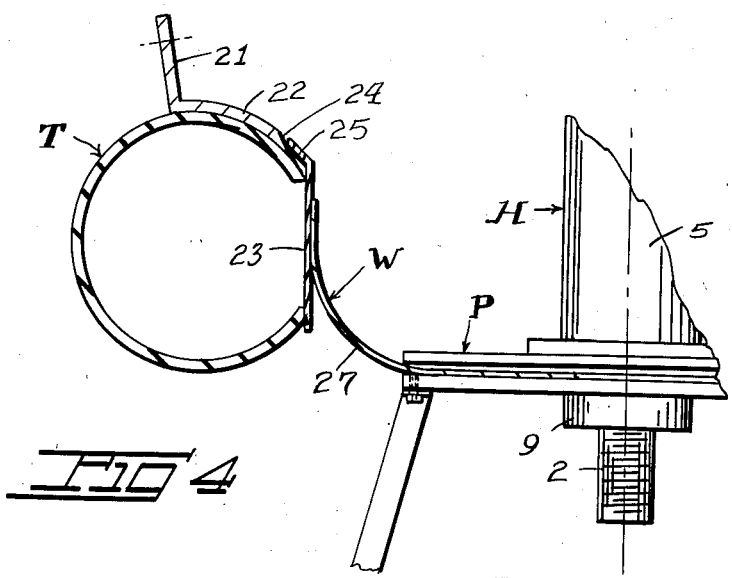

Patented Sept. 30, 1952

2,612,214

UNITED STATES PATENT OFFICE 2,612,214

AXIALLY SHIFTING TYPE HYDRAULICALLY OPERABLE TIRE REMOVER

Elbern A. Zang, Wichita, Kans.

Application January 9, 1947, Serial No. 720,951

1 Claim. (Cl. 157—1.2)

This invention relates to an apparatus for removing tires and it is primarily an object of the invention to provide an apparatus of this kind which can be employed to particular advantage in the removal of a tire under adverse conditions and particularly when the tire and/or the lock ring are frozen, as by rust, to the rim or when the rubber within the beads of a tire adheres to the rim from heat generated while the wheel is in service or heat generated from the brakes.

It is also an object of the invention to provide an apparatus of this kind which can be employed in a manner to effect the removal of a tire without liability of material damage to the bead of the tire as would be likely when a tire iron or a conventional heavy hammer is used in the removal operation.

The invention consists in the details of construction and in the combination and arrangement of the several parts of my improved tire removing apparatus whereby certain advantages are attained, as will be hereinafter more fully set forth.

In order that my invention may be better understood, I will now proceed to describe the same with reference to the accompanying drawings, wherein:

Figure 1 is a view in side elevation, with portions broken away of a tire removing apparatus constructed in accordance with an embodiment of my invention and in operative engagement with a tire;

Figure 2 is a view in top plan of the device or structure as illustrated in Figure 1;

Figure 3 is an enlarged fragmentary, vertical sectional view with parts in elevation, taken through the device and showing the apparatus in position to remove a lock ring; and Figure 4 is a fragmentary view partly in elevation and partly in section showing the apparatus being used to remove a marginal portion of a tire from the rim of a wheel.

As illustrated in the accompanying drawings, B denotes a leg supported base of desired dimensions and which includes in its upper portion a table 2 preferably cylindrical in plan and, of course, of required radius.

This table 2 at its axial center is provided with a relatively large opening 3 through which is adapted to be inserted from above a relatively heavy shank 4 depending from the axial center of a clamping and supporting base plate P upon which the cylinder 5 of a hydraulic jack H is secured by bolts or other suitable means, as shown. This jack H is of any preferred type and therefore a detailed description and illustration thereof is believed to be unnecessary other than to state that it includes the outwardly disposed plunger 6 provided therethrough at spaced points therealong with the spaced openings 7 whereby may be adjustably mounted upon the outer portion of the plunger 6 a collar 8.

Threading upon the shank 4 below the table 2, when the jack H and plate P are mounted thereon, is a holding or binding nut 9.

At predetermined points spaced around the collar and preferably at equi-distantly spaced points are the pairs of outstanding ears 10 herein disclosed as four in number, although, of course, I do not wish to be understood as limiting myself in this respect.

Pivotally connected as at 11 between each pair of ears 10 is an end portion of an elongated lever 12 and pivotally connected to the inner portion of the lever 12 as at 14 at a point in relatively close proximity to the inner pivotal connection 11 is the upper end portion of a rigid link 15 of desired length. The opposite or lower end portion of this link 15 is pivotally connected as at 16 between a pair of upstanding spaced ears 17 carried by the clamping plate P and such link moves relatively to the plate in accordance with the direction of movement of the lever 12.

The outer extremity of each of the levers 12 has pivotally connected therewith as at 18 the upper extremity of a depending swinging arm 19 which at its lower extremity carries an arcuate cross member 20 extending equi-distantly beyond opposite sides of the arm 19 and herein disclosed as also extending therebelow.

Rigid with the opposite end portions of the cross member 20 and entirely to one side of the arm 19 is an upstanding flange 21 carried by the outer marginal portion of an inwardly directed presser foot 22 disposed on a downward curvature closely approaching that of the normal curvature of the side or apron portion of a tire T as carried by the rim 23 of the conventional disk type of wheel W.

The feet 22 are of substantially the same length and are disposed also on a curvature conforming to the circumferential curvature of the tire T and said foot is relatively wide so as to have an effective bearing or pressing contact upon the side wall of the tire T. The outer or free longitudinal margin 24 of each of the shoes is of a knife edge to facilitate its having an effective engagement with either the conventional marginal flange 25 of the rim 23 or with the lock ring 26 associated with a tire assembly T.

When it is desired to remove the lock ring of a tire assembly, the jack H and parts carried thereby are released from the table 2 whereupon the wheel W is placed on the table with the web 27 thereof resting upon the table from above with, of course, the tire T disposed outwardly beyond the table 2 and surrounding the same. The jack H is then applied and the arms 19 adjusted to bring the feet 22 into proper engagement with the ring 26 as clearly illustrated in Figure 3, whereupon the jack H is operated to move the plunger 6 outwardly. This will result in downward movement being imposed on the feet 22 with a resultant pressure sufficient to effect release of the ring 26 without the necessity of using a tire arm or a conventional heavy hammer and in a manner whereby is substantially eliminated the liability of materially damaging a bead of the tire. In freeing the tire T from the flange 25, the wheel W is applied to the table 2, as illustrated in Figure 4, in a manner whereby the flange 25 is upwardly disposed. Feet or shoes 22 are then caused to operatively engage the upper side portion of the tire T in the same manner as just recited in connection with the removal of the lock ring 26.

From the foregoing description it is thought to be obvious that a tire removing apparatus constructed in accordance with my invention is particularly well adapted for use by reason of the convenience and facility with which it may be assembled and operated.

I claim:

An apparatus for removing a tire from the rim of a wheel body comprising a supporting table for said wheel body and having a central opening, a clamping plate adapted to be positioned upon the wheel body, a stud depending from the center of the lower side of said plate through the wheel body and said opening, a nut threaded on the stud to secure the wheel body and said plate on the table, a jack unit rising from the center of said plate and having a vertically movable plunger, levers pivotally connected at their inner ends to the plunger and extending radially outwardly therefrom a substantial distance beyond the table and clamping plate, link members pivotally connecting said levers intermediate their ends with the clamping plate, depending arm members pivotally attached to the outer ends of the levers, and a presser foot attached to the lower end of each arm member for movement downwardly against the side of a tire on the wheel body.

ELBERN A. ZANG.

REFERENCES CITED

The following references are of record in the file of this patent:

UNITED STATES PATENTS

| Number | Name | Date |
|---|---|---|
| 1,170,612 | Covey | Feb. 8, 1916 |
| 1,667,351 | Levitt | Apr. 24, 1928 |
| 1,983,608 | Hand | Dec. 11, 1934 |
| 2,375,956 | Smith et al. | May 15, 1945 |
| 2,418,849 | Polt | Apr. 15, 1947 |
| 2,446,963 | Stolz | Aug. 10, 1948 |